July 28, 1942.    C. T. MULVANY    2,291,484
APPARATUS FOR AUTOMATICALLY ASSEMBLING NUTS AND BOLTS
Filed June 6, 1941    4 Sheets-Sheet 1

Inventor
Clyde T. Mulvany,
Attorney

July 28, 1942.   C. T. MULVANY   2,291,484
APPARATUS FOR AUTOMATICALLY ASSEMBLING NUTS AND BOLTS
Filed June 6, 1941   4 Sheets-Sheet 2
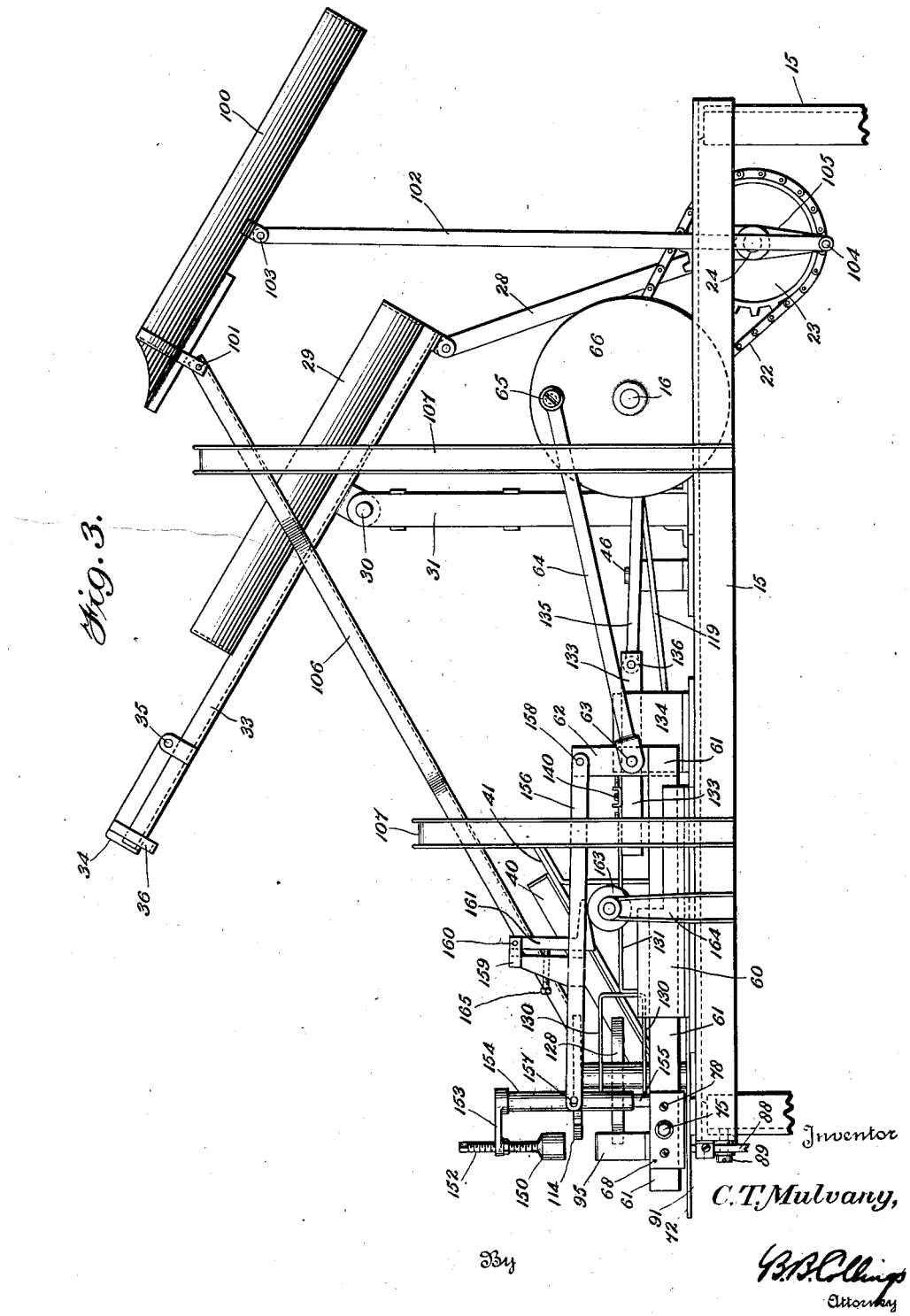

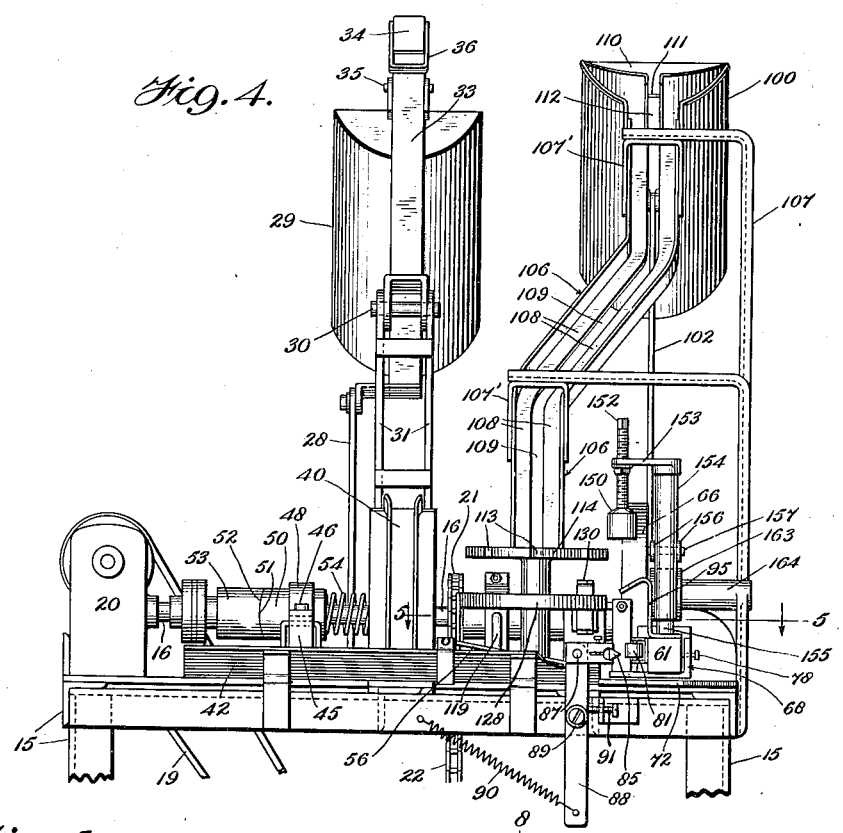

July 28, 1942. C. T. MULVANY 2,291,484
APPARATUS FOR AUTOMATICALLY ASSEMBLING NUTS AND BOLTS
Filed June 6, 1941 4 Sheets-Sheet 4

Inventor
Clyde T. Mulvany,
By B.B. Collins
Attorney

Patented July 28, 1942

2,291,484

UNITED STATES PATENT OFFICE 2,291,484

APPARATUS FOR AUTOMATICALLY ASSEMBLING NUTS AND BOLTS

Clyde T. Mulvany, Los Gatos, Calif.

Application June 6, 1941, Serial No. 396,923

12 Claims. (Cl. 10—155)

The invention relates to a machine for assembling nuts and bolts, and is a further development of the apparatus disclosed and claimed in my prior application filed September 13, 1940, Serial No. 356,714, now Patent No. 2,248,183, granted July 8, 1941, in that I have improved and simplified certain of the features of that apparatus. Furthermore, so far as the disclosures of the said prior application are concerned, while the nuts were automatically fed to the assembling mechanism, the bolts were fed by hand, whereas in the machine of the present application means are provided for automatically feeding the bolts as well as the nuts, so that the operator need only see that a supply of each is maintained in their respective hoppers or receptacles, and that the assembled product is removed at suitable intervals.

The principal object of the invention is the provision of means for automatically feeding the bolts to the assembly elements, with subsidiary objects being to improve the construction and arrangement of certain parts of my prior machine to render their operation more certain and efficient.

With the above and other objects in view, which will appear as this description proceeds, the invention consists in the novel details of construction and combinations and arrangements of parts, more fully hereinafter disclosed and particularly pointed out in the appended claims.

Referring to the accompanying drawings forming a part of this specification, in which like reference characters designate like parts in all the views:

Fig. 3 is a side elevational view, on a somewhat larger scale, of the essential elements of the machine, as seen from the side opposite to that shown in Fig. 1;

Fig. 4 is an end elevational view of the parts illustrated in Fig. 3, as seen from the left of the latter figure;

Fig. 5 is a fragmentary sectional plan view, on a still larger scale, taken approximately on the plane indicated by the line 5—5 in Fig. 4;

Fig. 6 is a vertical longitudinal sectional view, taken approximately on the plane indicated by the line 6—6 of Fig. 5, looking in the direction of the arrows;

Fig. 7 is a view similar to Fig. 6 and taken on substantially the same plane but looking in the opposite direction; and Fig. 8 is a cross sectional view taken approximately on the plane indicated by the line 8—8 of Fig. 5, looking in the direction of the arrows.

Figure 1:
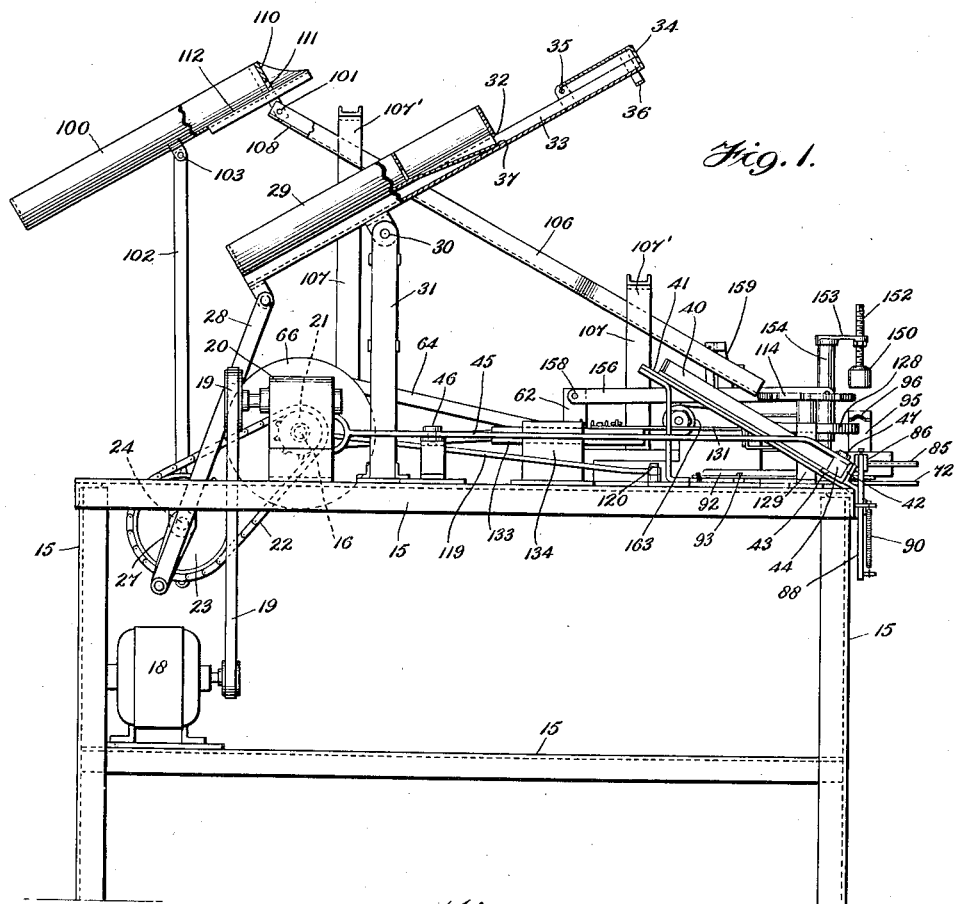
Figure 1 is a side elevational view of one form of nut and bolt assembling machine constructed in accordance with the present invention.
Figure 2:
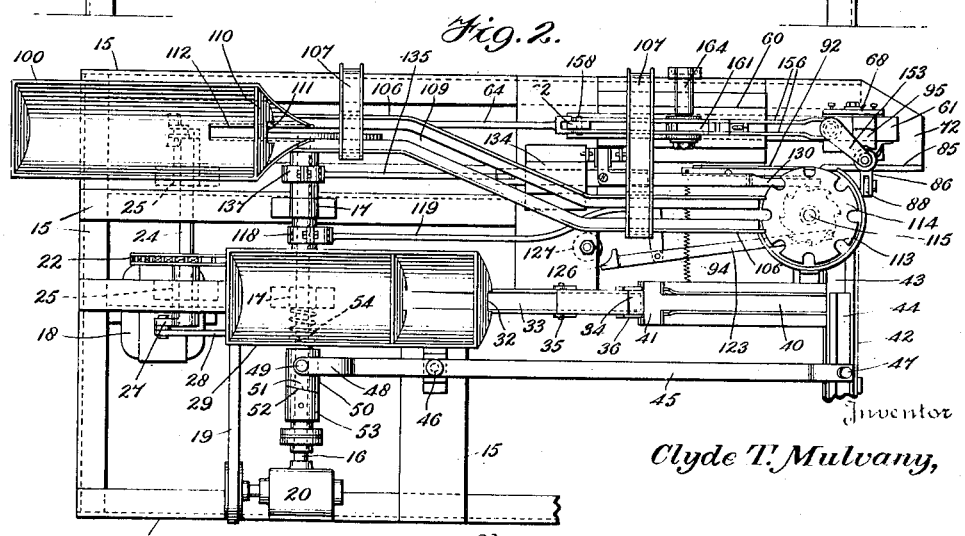
Fig. 2 is a top plan view of the machine shown in Fig. 1.

Referring more particularly to the said drawings the apparatus, as here shown, comprises supporting framework 15 upon which a main shaft 16 is journaled in bearings 17, being driven from any appropriate source of power such, for example, as an electric motor 18 through a belt and pulley drive 19 and a worm or other suitable reduction gearing enclosed within a housing 20. The main shaft 16 carries a sprocket 21 about which is trained a chain 22, which also passes around a sprocket 23 carried by a jack-shaft 24 journaled in bearings 25 supported by the framework 15. The said jack-shaft 24 is provided at one end with a crank arm 27 which is connected by a pitman 28 to a nut hopper or receptacle 29 which is pivotally mounted as at 30 on the upper end of a standard 31 arising from and supported by the framework 15. The right hand end of the nut receptacle 29, as viewed in Figs. 1 and 2, is provided with a feed opening 32 through which the nuts may pass, one at a time, to a trough 33, carried by and extending from the receptacle, when the inclination of the latter is reversed upon rotation of the jack-shaft 24 through an angle of 180°. The outer end of the said trough carries a gate member 34 pivotally mounted thereon as at 35 and normally maintained by gravity in the position shown in Figs. 1, 2, 3 and 4 to prevent discharge of the nuts from the trough. The gate member 34 carries a strap member 36 which constitutes the actuating means therefor, whereby at the proper times it may be swung upon its pivots 35 to permit discharge of the nuts from trough 33, as will appear more fully below. A shoulder 37 is provided at the feed opening 32 of the hopper 29, to prevent the return to the hopper of such nuts as remain in the trough when the hopper and trough are restored to the positions shown in the drawings through continued rotation of the jack-shaft 24.

A fixed inclined longitudinally disposed nut chute 40 is mounted on the framework 15, with its bottom wall extending somewhat beyond the upper ends of its side walls, as at 41, which extension is engageable by the strap member 36 of gate 34 as the gate and trough 33 descend from their illustrated position, which engagement arrests the downward motion of the gate while that of the trough continues until it subsequently also engages said extension. The effect of this action of course is to open the gate and permit nuts in the trough to be discharged therefrom to the chute 40.

At its lower end the chute 40 discharges to a transversely disposed nut guiding member 42, here shown as comprising a section of angle iron supported on the framework 15 with one of its legs 43 inclined in the plane of and flush with the bottom wall of chute 40. A nut feeding bar or plunger 44 is slidably positioned in the said transverse guide member 42, being reciprocatable therein to move its forward end back and forth across the discharge end of chute 40, by means of a lever 45 pivotally mounted on the framework 15 as at 46 for horizontal oscillating movements. The said lever is pivotally connected at one end, as at 47, to the bar or plunger 44, and at its other end is provided with a yoke 48 embracing and pivotally connected as at 49 to a cam sleeve 50 which is mounted for axial but not rotational movements on the main shaft 16. The sleeve 50 has a cam face 51 at one end thereof which engages and coacts with a companion cam face 52 formed on a cam member 53 which is rigidly carried by the shaft 16 for rotation therewith. Engagement between the said cam faces is maintained by a compression spring 54, surrounding the shaft 16 and pressing against the sleeve 50, as best shown in Figs. 2 and 4. Obviously, rotation of the shaft 16 and cam member 53 will, in conjunction with the spring 54, impart reciprocatory movements to the cam sleeve 50 which will be transmitted by the lever 45 to the nut feeding bar or plunger 44 to move its end back and forth across the lower end of chute 40, and push the nuts fed from the chute to the transverse guide member 42 along the latter. A gravity actuated detent bar 56 is pivotally mounted as at 57 above the transverse guide member 42 and its free end engages the nuts adjacent the discharge end of the said guide member to regulate their discharge and insure that they are fed one at a time to the assembling mechanism.

A bearing 60 is mounted upon the framework 15, in which is reciprocatably mounted a slide 61, one end of which is provided with a rigid upright arm 62 to which is pivotally connected as at 63 one end of a pitman 64, the other end of which is connected as at 65 to a crank disk 66 carried by the main shaft 16. At its other end, which reciprocates across the discharge end of the nut guide 42, the slide 61 carries an angle member 68, a portion of the horizontal leg 69 of which is cut away as at 70 to provide a toe 71 which during inward movement of the slide engages the nuts as they are fed to the cut-away portion 70 from the guide 42. This feed of the nuts occurs when the parts are in substantially the positions shown in Figs. 1, 2 and 3, and as the slide continues its inward movement, the toe 71 moves the nuts inward on the plate 72 to the bolt feeding position, being that in which the parts are illustrated in Figs. 5, 6 and 8. The nuts are engaged by a resilient stop member 73 at this point which assists in positioning them accurately for engagement of their threaded openings by the ends of the bolts. The angle member 68 is adjustably mounted on the slide 61 by means of a screw or bolt 75 threaded into the said slide and passing through a longitudinally elongated slot 76 in the upright leg 77 of the angle member, see Fig. 5. The said leg 77 also carries a pair of screws 78 threaded therein and bearing against the outer vertical face of the slide. By proper manipulation of the screws 75 and 78 the position of the angle member 68 may be varied longitudinally and transversely of the slide to accommodate its cut-away portion 70 and toe 71 to nuts of different sizes, and cause them to be accurately positioned at the bolt-feeding point, as will be readily understood.

Above the cut-away 70 and toe 71 of the angle member the slide 61 is provided with a bracket 80 which mounts a pair of adjacent rolls 81 journaled for rotation upon parallel vertical axes. These rolls accomplish in an improved manner the function performed by the semi-circular recess provided in the forward end of the slide of the machine disclosed in my said prior application, viz. they receive and cradle between them the lower portions of the stems of the bolts 82, as indicated in broken lines in Figs. 6 and 8, and provide a rolling or anti-friction bearing for the said stems as the bolts are rotated during forward motion of the slide to thread them into the nuts.

As in my former machine a longitudinally fixed, transversely movable spring pressed member 85 is provided for engaging the bolt stems opposite the rollers 81 and imparting rotation to them as the slide 61 moves forwardly. As here shown the said member 85 is in the form of a bar of triangular cross section with one of its apices facing toward the slide 61 and rollers 81, for engagement with the bolt threads. This bar is rigidly carried by a split clamping block 86 which is pivotally mounted as at 87 on the upper end of a lever 88 which is journaled as at 89 on the framework 15. A spring 90 connected to the lower end of the lever 88 and to the frame yieldingly urges the bar 85 into engagement with the bolts, and an adjustable stop screw 91, engageable by the said lever, may be provided to limit such movement. The pivoting of the clamping block 86 on the lever 88 permits the bar 85 to rise and fall to follow the threads as the bolts are rotated.

Although numerous changes and improvements have been made in structural details and in arrangement of the parts, the elements thus far described are generically the same in purpose and function as their counterparts in my prior application. In addition thereto, however, the present machine incorporates a resilient transverse nut guiding member in the form of a bar or angle iron 92, best shown in Figs. 1, 5, 7 and 8, pivoted as at 93 on the framework for horizontal transverse movements and controlled by a tension spring 94. The operative end of this member, being the right hand end as viewed in Figs. 1, 2 and 5, is positioned adjacent the discharge end of the transverse nut guide 42, to yieldingly engage one side face of the nuts as they are moved to the bolt-feeding position by the toe 71 and press them against the opposite face of the cut-away 70 of angle member 68, thereby insuring the proper transverse location of the nuts for the reception of the bolts. The present machine also includes an upper bolt guide, here shown in the form of a substantially Z-shaped member 95 rigidly carried by the slide 61, with its upper leg projecting over the rolls 81 and provided with a recess 96 for receiving and guiding the upper portion of the bolt stems, as indicated in Figs. 6 and 8. These two elements have no counterparts in the prior machine.

The automatic bolt-feeding mechanism constituting the principal feature of the present invention comprises a bolt hopper or receptacle 100 pivotally mounted as at 101 for oscillatory movements similar to those of the nut hopper 29, which movements are imparted to it by a pitman 102, one end of which is pivotally connected to the hopper 100 at 103 and the other end of which is connected as at 104 to a crank arm 105 carried by the jack-shaft 24. The said hopper may be supported by a standard similar to that which mounts the hopper 29, but as here shown it is pivoted at 101 to the upper end of the longitudinal inclined bolt chute 106 which is supported by brackets or standards 107 extending upwardly from framework 15. As best shown in Figs. 2 and 4, this chute comprises a pair of complementary angle members the transverse legs 108 of which are faced toward one another in spaced relation to provide a slot 109 through which the stems of the bolts may project downwardly, the heads of the bolts resting and sliding on the webs or flanges 108, as will be readily understood. The angle members of the chute 106 are held in spaced relation to maintain the slot 109 through the use of inverted U-shaped strap members 107' rigidly carried by the ends of the standards 107, the depending legs of such strap members being rigidly secured to the side flanges of the respective angle members, as will be clear from Fig. 4.

The end wall 110 of the bolt hopper is provided with a feed opening 111, while its bottom wall is provided with a feed slot 112, which slot and opening co-operate, when the inclination of the hopper is reversed through 180° rotation of the jack-shaft 24, to permit serial discharge of the bolts from the hopper to the chute 106, with their heads riding on the flanges 108 and their stems projecting downward through slot 109. Upon discharge of the bolts from the hopper to the chute, they will slide by gravity action to the lower end of the latter, where their stems will be sequentially received in the circumferentially spaced recesses 113 provided around the periphery of a horizontally disposed bolt feeding disk 114, the bolt heads of course resting upon the upper surface of said disk. The disk is carried by a vertical shaft 115 which is journaled in a bearing 116 carried by framework 15, and is intermittently rotatable by a ratchet wheel 117 carried by the lower end of said shaft.

As best shown in Figs. 2, 5 and 7, this ratchet wheel is actuated from the main shaft 16 by means of an eccentric 118 carried thereby, from which a connecting rod 119 extends forwardly and is connected at 120 to a lever 121, one end of which is pivoted as at 122 on the framework 15, and to the other end of which lever a pawl arm 123 is pivoted at 124. One end of the pawl arm carries a pin 125 which is engageable with the teeth of the ratchet wheel 117 to impart movement thereto when the lever 121 and arm 123 are moved toward the right, as viewed in Figs. 2 and 5, by the eccentric 118 and connecting rod 119. The teeth of wheel 117 are sufficiently hooked, as clearly shown in these figures, to retain the pin 125 in engagement during this motion, but upon return movement of the parts toward the left, the pin and arm will swing away from the wheel, assuming substantially the positions illustrated in full lines in Fig. 5. In order to swing the arm back to engage the pin with the succeeding ratchet tooth, the left hand end of the arm, as viewed in said figure, is provided with a member or portion 126 positioned to engage a stud or roller 127 carried by the frame 15, which, during the latter part of the return movement of the arm, causes the arm to swing on its pivot 124 to assume the broken line position shown, thus engaging the pin with the next ratchet tooth.

The intermittent motion of the ratchet wheel 117 is transmitted through the vertical shaft 115 to the disk 114, whereby the bolts which are fed to the disk from the chute 106 are moved step-by-step in a counterclockwise direction, as viewed in Figs. 2 and 5, through an angle of 270°, at which point they are automatically removed from the disk and presented to the nuts which have been moved to immediately below this discharge point of the disk by the nut feeding mechanism previously described. Unintentional displacement of the bolts from the disk during their travel therewith is prevented by a fixed semi-circular guide member 128 mounted by a supporting bracket 129 on framework 15, which guide member is engageable by the bolt stems if they tend to work out of the disk recesses 113.

The automatic transfer of the bolts from the disk is accomplished by a pair of fingers 130 constituting extensions of a lever 131 pivoted for transverse oscillatory movements at 132 to a slide 133 reciprocatively mounted in a bearing 134 carried by frame 15. This slide is moved back and forth in the said bearing by a connecting rod 135 connected to the slide at 136 and actuated by a cam or eccentric 137 on main shaft 16. The lever 131 is provided with an angularly disposed extension 140 which, as best shown in Figs. 5 and 7, extends between the upstanding legs 141 and 142 of a fixed U-shaped member 143, which legs are provided with the adjustable stop screws 144 and 145 respectively. When the slide 133 is in its rearward position, as shown in Fig. 2, the lever 131 and fingers 130 extend forwardly in substantial axial alinement therewith, and the parts are so timed that the disk 114 will move a bolt into the transfer or discharge position at this time. Then, while the disk remains stationary during the retraction of the pawl arm 123 and the reengagement of its pin 125 with the next tooth of the ratchet wheel 117, the slide 133, lever 131 and fingers 130 will be moved forwardly, i. e. to the right as viewed in Figs. 2 and 5. During the initial part of this motion the end portions of the fingers will move behind the bolt, that is, between it and the axis of disk and shaft 115, but toward the end of the forward motion of the slide 133 the lateral extension 140 of the lever 131 will engage the stop screw 145, the effect of which is to move the lever 131 counterclockwise on its pivot 132 to substantially the position shown in Fig. 5 and thereby cause the fingers 130 to engage and move the bolt radially outward of the disk to disengage it from the recess 113 thereof which it has occupied. This movement brings the lower portion of the bolt stem into cradled engagement with the rolls 81 and an upper portion of said stem into the recess 96 of the bolt guide 95, and as the bolt head clears the disk the bolt will drop slightly to present the lower end of its stem to the threaded hole in the nut which has been positioned beneath it. Upon retraction of the slide 133 the lever extension 140 will engage the stop screw 144 to restore the lever and fingers to their original position.

A pressure member or weight 150 is lowered into engagement with the bolt head at this time to press the bolt down and insure entrance of its threads into those of the nut as the elements are moved forwardly, or to the right as viewed in Figs. 1, 2, 5 and 6, through advance of the slide 61, which now takes place. The said pressure member 150 has a swivel connection with a threaded rod 152 which is adjustably carried by an arm 153 rigidly secured to the upper end of a sleeve 154 which is slidably mounted upon a pin or stud 155 rigidly carried by and extending upwardly from the slide 61. One end of a pair of horizontally spaced links 156 embraces and is pivotally secured to opposite sides of the sleeve 154, as at 157, the other end of said links being pivoted at 158 to the upright arm 62 of the slide 61. These links rigidly carry a bracket 159 to which is pivoted as at 160, an L-shaped dog 161, the under surface 162 of which is positioned for engagement with the periphery of a roll 163 which is rotatably mounted beneath the links 156 by a bracket 164 carried by frame 15. An adjustable stop screw 165 is carried by the bracket 159 and the dog 161 being pendulous normally rests against such screw, as indicated in Figs. 3 and 6.

When the slide 61 is at the limit of its forward advance at the end of an assembly operation the dog 161 will be forward of the roll 163, or to the left thereof as viewed in Fig. 3. As the slide is retracted the under inclined surface 162 of the dog will engage the periphery of the roll, the effect of which is to swing the links 156 upwardly about their pivots 158, thereby elevating their forward ends together with the sleeve 154, arm 153 and pressure member or weight 150. The parts are so timed that this occurs as a bolt is being transferred from the feed disk 114 to the rolls 81 and bolt guide 95, and as the bolt drops into engagement with the nut aperture the heel of the dog 161 clears the roll 163, permitting the links 156 and weight 150 to descend to bring the latter into engagement with the bolt head, upon which it rests and exerts pressure during the succeeding forward movement of the slide. During such movement the dog will again engage the roll 163, but this time it will swing upon its pivot 160, as indicated in broken lines in Fig. 6, whereby raising of the links and pressure member 150 will be avoided during the assembly operation.

When the slide 61 moves forward, engagement of the bolt stem with the member 85 will impart rotation to the bolt which will cause the bolt to be threaded into the nut, as in my prior machine. During this action the member 150, resting on the bolt head, not only presses the bolt downwardly to insure initial engagement of its threads with those of the nut, but also serves as an upper bearing for the bolt to maintain it upright and prevent it from falling away from the guide 95 and rollers 81. When the bolt is moved beyond the outer or forward end of the bar 85 and plate 72 the assembled bolt and nut will drop from the rolls 81 and guide 95 into any suitable receptacle, not shown. This discharge is facilitated by the downward inclination of the upper leg of the Z-shaped guide member 95, as will be readily understood.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. In a machine for automatically assembling nuts and bolts, having means for serially feeding the nuts to an assembly position and means for causing relative rotation between a juxtaposed bolt and nut at such position to engage their threads, means for automatically feeding the bolts to said position comprising a disk rotatably mounted adjacent said assembly position provided with means for receiving and holding a plurality of bolts; means for intermittently rotating said disk to move the bolts serially into co-operative relation to said position; and means actuated in timed relation to the feed of the nuts to the assembly position to remove the bolts from the disk as they are brought adjacent said position and transfer them into a juxtaposed relation to the nuts, said means comprising a lever mounted for longitudinal movement to a position in which a portion thereof lies behind a bolt carried by the disk, said lever also being pivoted for movement in a plane transverse to that of its longitudinal movement, and means for imparting transverse movement to the lever to cause it to remove the bolt from the disk.

2. In a machine for automatically assembling nuts and bolts, having a reciprocatable slide for inducing relative rotation between a juxtaposed bolt and nut at an assembly position, said slide being provided with means for receiving and positioning the nut and bolt in such juxtaposed relation, means for automatically feeding the bolts to the slide, comprising a member movably mounted adjacent the receiving position of said slide, for receiving and holding a plurality of bolts; means for moving said member to serially bring the bolts adjacent said receiving position; and means actuated in timed relation to the movements of the slide for serially removing the bolts from said member and transferring them to the bolt receiving and positioning means of the slide.

3. In a machine for automatically assembling nuts and bolts, having a reciprocatable slide for inducing relative rotation between a juxtaposed bolt and nut at an assembly position, said slide being provided with means for receiving the nut and means for receiving and positioning a bolt in juxtaposed relation thereto, means for automatically feeding the bolts to the slide, comprising a disk rotatably mounted adjacent the bolt-receiving position of the slide, said disk having circumferentially spaced recesses for receiving and holding a plurality of bolts; means actuated in timed relation to the movements of the slide for intermittently rotating said disk to serially bring the bolts adjacent the receiving position of the slide; and means for automatically transferring the bolts from the disk to the bolt receiving and positioning means of the slide.

4. A machine as specified in claim 2, wherein the means for removing the bolts from the holding member comprises an element mounted for movement to a position behind the bolt and operable through such movement to effect the transfer.

5. A machine as specified in claim 3, wherein the means for transferring the bolts from the disk comprise a second slide and means for reciprocating it toward and from the disk; a lever pivotally carried by said second slide for oscillatory movements transversely of the plane of reciprocation of the slide, said lever having a lateral projection and a portion which in the forward position of the slide is moved behind the stem of a bolt carried by the disk; and means engageable by the lateral projection of the lever as the second slide reaches the end of its travel in each direction, for moving said lever upon its pivot to cause it to move the bolt out of the disk recess and to restore the lever to its initial position.

6. In a machine for automatically assembling nuts and bolts, having means including a reciprocatable slide for inducing relative rotation between a juxtaposed bolt and nut to thread the bolt into the nut, and means for serially feeding the nuts and bolts to the slide in timed relation to its movements, means for guiding the bolts during assembly and insuring the initial engagement of their threads with those of the nuts, comprising a pressure member movable with the slide; and means for controlling said pressure member to cause it to engage and exert longitudinal pressure upon the bolt during an assembly operation, and to render said member ineffective while the bolts are being fed to the slide.

7. A machine as specified in claim 6, wherein the control means for the pressure member comprise a roll and a dog co-operating therewith to move said member away from the bolt position during the bolt feeding operation, and toward and into engagement with the bolt at the conclusion of such operation.

8. In a machine for automatically assembling nuts and bolts, having means including a reciprocatable slide for inducing relative rotation between a juxtaposed bolt and nut to thread the bolt into the nut, means carried by said slide for positioning the bolt relative to the nut comprising parallel rolls engageable by a portion of the bolt; and a guide member engageable with a portion of the bolt spaced from that engaged by the rolls.

9. In a machine for automatically assembling nuts and bolts, having a reciprocatable slide provided with means for receiving and holding a nut and bolt in juxtaposition, means co-operating with said slide to impart rotation to the bolt during movement of the slide in one direction, comprising a bar mounted against movement in the direction of slide movement but yieldingly urged transversely of the slide for engagement with the bolt stem; and means mounting said bar for movement in a plane substantially perpendicular to that of its yielding motion, whereby it may follow the threads of the bolt as the latter is rotated.

10. In a machine for automatically assembling nuts and bolts, having means including a slide for inducing relative rotation between a juxtaposed bolt and nut to thread the bolt into the nut, means carried by said slide for receiving and positioning the nut, comprising a member having a cut away portion for receiving the nut and engaging one side thereof, and a toe for engaging another side thereof; and means mounting said member upon the slide for adjustment in two directions, whereby the position of the cut away and toe may be varied to accommodate and corectly position nuts of different sizes.

11. In a machine for automatically assembling nuts and bolts, having a support, and means including a slide for inducing relative rotation between a juxtaposed bolt and nut to engage their threads, means for positioning the nut for engagement by the bolt, comprising two surfaces carried by the slide engageable with two sides of the nut; and a yieldable member carried by the support for engagement with another side of the nut.

12. In a machine for automatically assembling nuts and bolts, having means for serially feeding the nuts to an assembly position and means for causing relative rotation between a juxtaposed bolt and nut at such position to engage their threads, means for automatically feeding the bolts to said position comprising a disk rotatably mounted adjacent said assembly position, provided with means for receiving and holding a plurality of bolts; means for intermittently rotating said disk to move the bolts serially into co-operative relation to said position; and means actuated in timed relation to the feed of the nuts to the assembly position to remove the bolts from the disk as they are brought adjacent said position and transfer them into a juxtaposed relation to the nuts, comprising a slide mounted for longitudinal reciprocation toward and from the disk; a lever pivotally mounted on said slide for transverse movements, a portion of said lever being movable by forward motion of the slide to a position behind a bolt carried by the disk; and means engageable by a portion of the lever during said forward movement to swing the lever on its pivot and cause it to move the bolt from the disk.

CLYDE T. MULVANY.